United States Patent [19]

Zweifel et al.

[11] Patent Number: 4,641,268

[45] Date of Patent: Feb. 3, 1987

[54] CRUISE AIRSPEED CONTROL FOR AIRCRAFT

[75] Inventors: Terry L. Zweifel, Phoenix; Harry Miller, Scottsdale, both of Ariz.

[73] Assignee: Sperry Corporation, New York, N.Y.

[21] Appl. No.: 461,357

[22] Filed: Jan. 27, 1983

[51] Int. Cl.$^4$ .................. G05D 1/08; G06F 15/50
[52] U.S. Cl. ............................... 364/440; 364/433; 244/181; 244/182
[58] Field of Search ............ 364/424, 427, 434, 435, 364/440, 439, 433; 244/180–182, 188, 175; 318/584; 340/969–970, 977–978

[56] References Cited

U.S. PATENT DOCUMENTS

| | | | |
|---|---|---|---|
| 3,362,661 | 1/1968 | Booth | 244/182 |
| 3,510,092 | 5/1970 | Hendrick | 244/180 |
| 3,624,364 | 1/1970 | Dommasch | 244/182 |
| 3,908,934 | 9/1975 | Schloeman | 364/440 |
| 3,945,593 | 6/1976 | Schänzer | 364/435 |
| 3,989,208 | 11/1976 | Lambregts | 244/182 |
| 4,110,605 | 8/1978 | Miller | 364/463 |
| 4,312,041 | 2/1978 | DeJonge | 364/442 |
| 4,357,663 | 11/1982 | Robbins et al. | 244/182 |

Primary Examiner—Felix D. Gruber
Assistant Examiner—Thomas G. Black
Attorney, Agent, or Firm—Howard P. Terry; Albert B. Cooper

[57] ABSTRACT

A cruise speed control apparatus for aircraft wherein small differences between the target Mach command and the actual Mach number of the aircraft are used to displace the aircraft from its reference altitude to either increase or decrease actual Mach number in the short term. Long term differences are corrected through a special isolation filter to separate the engine control loop and pitch control loop dynamics and an integration technique to adjust the automatic throttles about a thrust target for the commanded Mach.

Large differences between the target Mach and the actual Mach or large changes in the commanded Mach are compensated for by a non-linear gain that effectively increases or decreases the target thrust to cause the aircraft to accelerate or decelerate to the commanded Mach.

11 Claims, 4 Drawing Figures

Typical narrow body transport aircraft

Typical jet engine thrust characteristics

CRUISE AIRSPEED CONTROL FOR AIRCRAFT

BACKGROUND OF THE INVENTION

1. Field of the Invention

The present invention relates generally to aircraft control systems and more particularly to a system for the achievement and maintenance of a desired cruise airspeed for the aircraft by a coordinated control and operation of the aircraft's engine throttles and its pitch attitude.

2. Description of the Prior Art

The problem of achieving and maintaining a cruise speed which results in minimizing the fuel consumption on modern jet aircraft is well known and is discussed further in Applicants' assignee's copending application Ser. No. 332,901, now U.S. Pat. No. 4,490,793, entitled "Cruise Speed Control for Aircraft Performance Management System" as filed on Dec. 21, 1981. As discussed therein, the basic difficulty is that the optimal cruise speed typically lies in a region of almost neutral speed stability; that is, large deviations in desired Mach number can occur at virtually constant engine thrust or engine pressure ratio (EPR) settings, and conversely, very small changes in engine thrust or EPR may result in very large Mach number changes.

Many prior art automatic throttle control systems used only a signal proportional to the difference between the desired optimal Mach number speed and the actual Mach number speed to alter the thrust setting of the engine(s). However, because of the neutral speed stability phenomenon, such systems exhibited oscillatory speed and throttle control characteristics that adversely affected fuel consumption and engine life and at the same time were objectionable to passengers and crew.

There have been recent attempts in the prior art to overcome the virtual neutral speed stability problem at aircraft cruise speeds. In one attempt, the algebraic sum of Mach speed error, that is, the difference between the commanded Mach number speed and the actual Mach number speed, the integral of Mach error, and the rate of change of actual Mach number was used to drive the aircraft's autothrottle system to adjust the thrust or EPR of the engines. In addition, a signal based on actual Mach rate, or alternatively, washed out actual Mach number was supplied to the pitch channel of the aircraft's autopilot where it was summed with the altitude hold signal when the autopilot was operating in its altitude hold mode in an attempt to reduce any detected Mach rate to zero. A turbulence detector was also used to override both the throttle control signal and the pitch cross control signal when the aircraft experienced unsteady atmospheric disturbances. While some success may have been achieved with this system, it had at least three basic shortcomings. In the first instance, the reduction of Mach rate to zero through the pitch autopilot does not ensure that Mach error is reduced to zero as is desired, it only ensures that the aircraft is not accelerating or decelerating. Thus, significant Mach errors due to relatively rapid atmospheric changes can be maintained until the autothrottles can adjust the EPR to correct for the error. In the second instance, there exists no dynamic separation between the pitch autopilot commands and the autothrottle commands. Any dynamic changes in actual Mach number due to pitching the aircraft to reduce the Mach rate signal to zero are directly reflected into the autothrottle system, resulting in unnecessary and undesirable throttle activity. In the third instance, the prior art example has no provision for the timely acquisition of the desired Mach number should the autothrottle system be engaged at a speed significantly different from the desired speed.

Another prior art approach to the solution of the neutral speed stability problem is described in the above referenced copending application, U.S. Ser. No. 332,901, now U.S. Pat. No. 4,490,793. In this system, a bias signal is introduced into the pitch autopilot altitude hold loop that tends to displace the aircraft from its reference altitude by an amount proportional to the detected Mach error. The resulting altitude error, $\Delta H$, defined as the difference between the reference altitude and the actual altitude, is used as the input to an integrator in the autothrottle control loop, the output of which is used to adjust the engine pressure ratio or thrust. While this system is generally satisfactory, one of its drawbacks is that the altitude error $\Delta H$, input to the autothrottle is affected by factors other than the proportional altitude hold bias generated by Mach error. Atmospheric disturbances, such as gusts and generally long term pressure waves, and the initial loss of altitude in turns can also affect this $\Delta H$ term, resulting in unnecessary throttle activity and speed excursions. In addition, no provision is made for the timely acquisition of the desired Mach number should the system be engaged at a Mach number significantly different from the desired Mach number.

The present invention differs from the first of the above attempts to solve the neutral speed stability problem in that the primary pitch control into the aircraft's autopilot is Mach error instead of Mach rate or washed out Mach error, and that the primary input to the autothrottle system is Mach error which has been passed through a special isolation filter and summed with the integral of Mach error. This combination not only eliminates the need for a turbulence detector, but more importantly serves to isolate the dynamics of the automatic pilot pitch axis control system from the dynamics of the autothrottle control system, thus minimizing or eliminating any cross coupling effects inherent in the prior art system first described above. In addition, provisions are made through an independent control to allow for timely acquisition of the desired Mach number.

The present invention is a significant improvement of the system described in U.S. Ser. No. 332,901 in that the primary input to the autothrottle system is filtered Mach error plus integrated Mach error instead of integrated altitude error. The control system of the present invention eliminates the adverse effects of atmospheric disturbances and aircraft bank angles on the autothrottle system, thereby desirably minimizing throttle activity. In addition, an independent control is used which allows for the timely acquisition of the desired Mach number.

SUMMARY OF THE INVENTION

The present invention provides a flight control system which assures the acquisition and maintenance of a fuel efficient cruise speed, usually expressed in Mach number, for modern jet aircraft, with a minimum of throttle activity and cross coupling between the aircraft's pitch and thrust axes.

Upon initialization of the system, either manually by the pilot of the aircraft or automatically by the leveling off of the aircraft at a selected cruise altitude through the aircraft's autopilot, the thrust required to maintain the desired Mach number is computed based on optimum performance data of the aircraft. This required thrust may be expressed in terms of engine pressure ratio (EPR) or in engine fan speed (N1), and serves as the starting point for further control adjustments.

If, at initialization, the value of the signal proportional to the actual Mach number of the aircraft subtracted from a signal proportional to the desired Mach number, (hereinafter defined as Mach error), is less than a predetermined level, the Mach error signal is introduced at an appropriate gain level to the altitude hold control of the aircraft's autopilot. This causes the aircraft to climb or dive within predetermined limits to exchange potential energy for kinetic energy and thus serves to maintain speed for short term speed perturbations of the aircraft.

Simultaneously, the Mach error signal is passed through an isolation filter and gain. The output of the filter is summed with a signal proportional to the integral of the Mach error signal to create an incremental thrust control signal which is added algebraically to the originally computed thrust signal to thereby maintain the aircraft at the desired Mach number. The resultant total thrust control signal is converted to an EPR or N1 target which is used by the autothrottle system to adjust the throttles appropriately. Thus, long term errors in the computed thrust are automatically compensated.

If, at initialization, the Mach error exceeds a predetermined value, a separate control is use through suitable switching logic. The magnitude of the Mach error signal is passed through a non-linear gain and this signal determines an incremental EPR or N1 to be summed algebraically with the target EPR or N1 derived from the computed required thrust. This total is limited in the throttle servo controls to a value within the engine operating limits and is then used by the autothrottle system to adjust the thrust of the aircraft. The resultant increase or decrease in thrust will cause the aircraft to accelerate or decelerate, respectively, toward the desired cruise Mach number. As the Mach error is reduced, i.e., as the desired Mach number is approached, the incremental EPR or N1 is decreased toward the original target until, at a predetermined value of Mach error, control of speed reverts to the method described previously.

DESCRIPTION OF THE PREFERRED EMBODIMENT

Figure 1A:
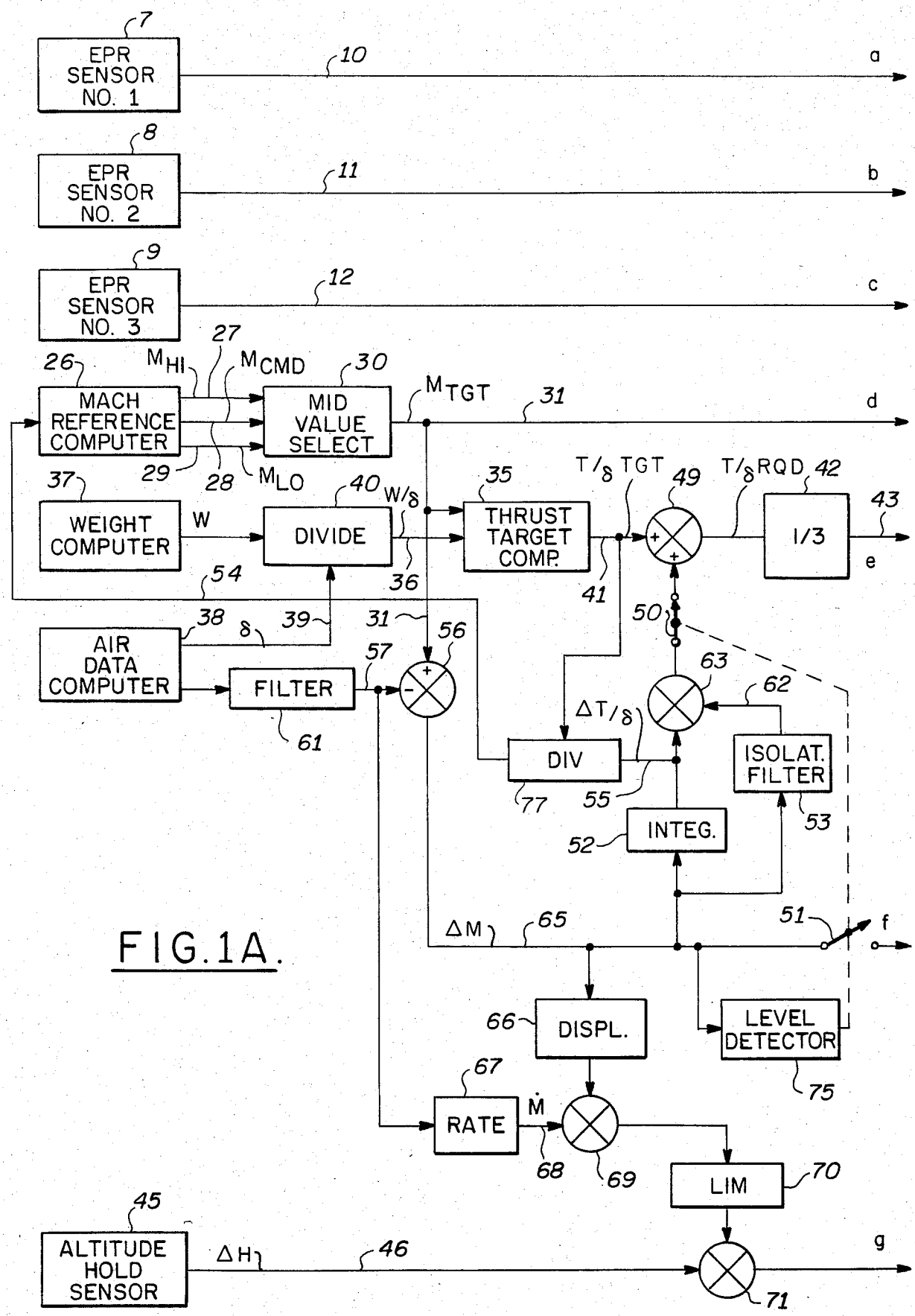
FIG. 1A and 1B are schematic block diagrams illustrating a preferred embodiment of the present invention and constitutes the apparatus active in a cruise control mode of a complete aircraft performance management system.
Figure 1B:
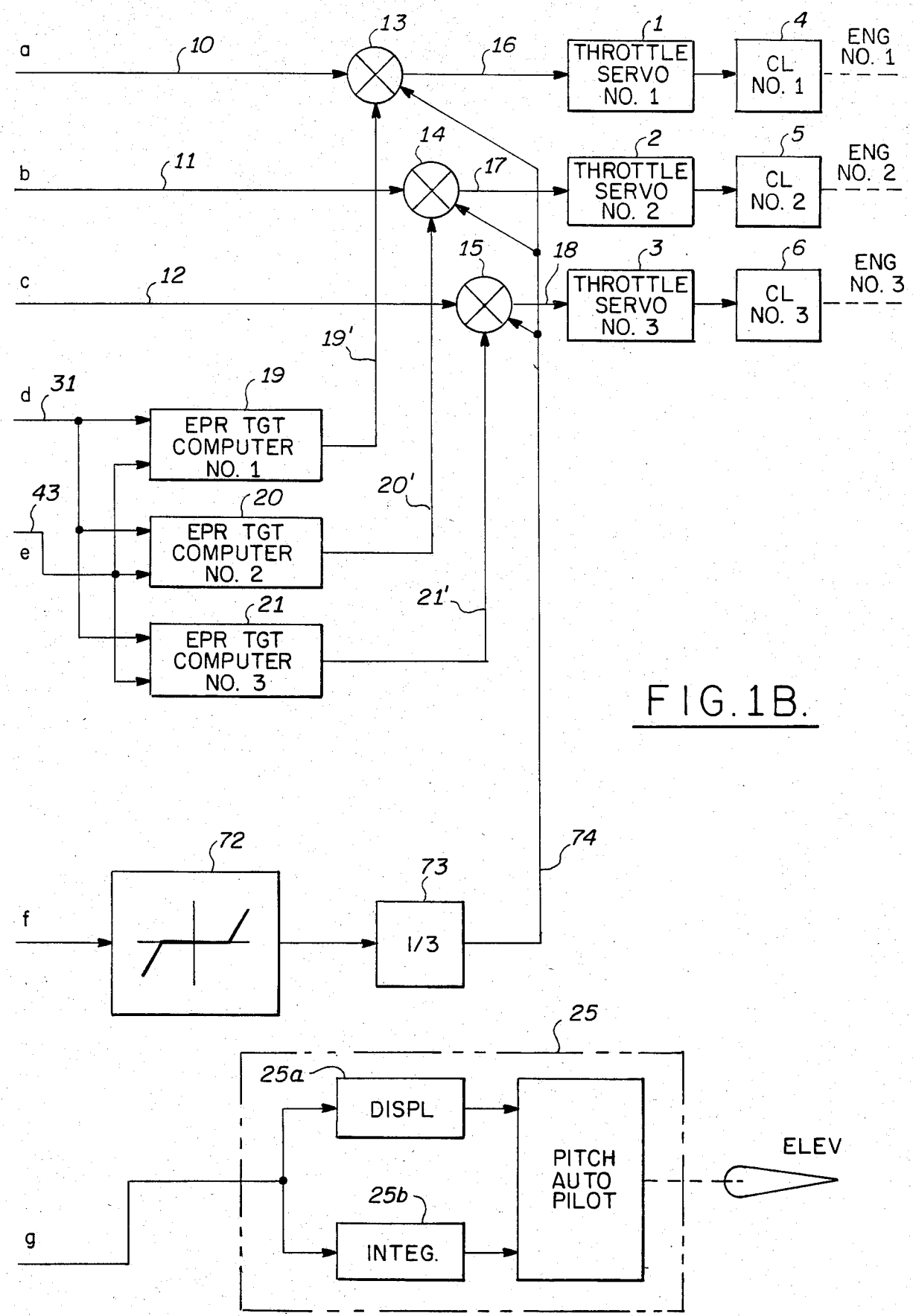

Referring to FIG. 1, the aircraft apparatus involved in producing or controlling the aerodynamic forces acting on the aircraft includes an automatic throttle control system for controlling aircraft thrust through the engines and an automatic flight control system for controlling the pitch attitude of the craft through the elevators.

In the illustrated embodiment, the aircraft is a typical three turbojet engine transport having conventional three throttle servomotor controls, 1, 2, 3 which operate the respective throttle linkages through conventional noback clutch mechanisms 4,5, 6 which may be of the type disclosed in the present inventor's U.S. Pat. No. 3,505,912 assigned to the present assignee. The throttle servos are each controlled from respective conventional engine pressure ratio sensors 7, 8, 9 via leads 10, 11, 12 summing junctions 13, 14, 15 and leads 16, 17, 18 the latter representing EPR error signals which are the difference between the actual engine EPR's and the EPR references or EPR targets computed in computers 19, 20, 21 as will be described below. Thus, in conventional fashion, the engine throttles are automatically controlled so as to establish and maintain the actual engine EPR's at their desired reference or target EPR. The autothrottle control system also includes conventional EPR limits (not shown) which establish the maximum EPR at which the engines are allowed to operate under existing ambient temperatures, atmospheric pressure, etc., as established by the engine and aircraft manufacturers. However, EPR settings for cruise are normally well below these limits. As is well known, EPR provides a measure of the thrust the engines impart to the aircraft and this characteristic is described in the present assignee's U.S. Pat. 4,110,605.

The automatic flight control system is entirely conventional. As is well known, it includes gyroscopic roll, pitch and yaw references, roll, pitch, and yaw computers and roll, pitch and yaw control surface servomotors for controlling these control surfaces to in turn control the attitude and flight path of the aircraft. A typical autopilot is disclosed in the present assignee's U.S. Pat. 2,998,946. For purposes of the present invention only, the pitch control computer 25 is illustrated and constitutes a means for controlling the pitch attitude of the aircraft. As shown in detail in the referenced '946 patent, the autopilot includes an altitude hold mode. In this mode an altitude deviation sensor supplies an altitude error signal to the autopilot 25 pitch channel, through a displacement path 25a and integral path 25b which pitches the aircraft up or down in order to reduce the altitude error to zero in conventional fashion.

In accordance with the present invention, an optimum or most economical reference or target Mach number cruise speed $M_{TGT}$ is computed by the performance management system Mach reference computer 26 which target is based on existing measurable and known flight parameters including aircraft weight and drag characteristics and external parameters including pressure altitude, air temperature and winds. Various reference cruise speeds may be conventionally computed depending on desired over-all economy goals such as maximum cruise speed, economy cruise speed, maximum range cruise speed and the like.

These various Mach reference speeds and the relationship of the aircraft and aerodynamic parameters involved in computing the same are described in Report No. NASA TM-78519 entitled "Characteristics of Constrained Optimum Trajectories with Specified Range" by Heintz, Erzberger and Homer Lee, Ames Research Center, Moffett Field, Calif. 94035. Alternatively, of course, the desired or target Mach cruise speed may be set by the pilot through a conventional speed set knob and readout. The Mach reference computer 26 provides three outputs 27, 28, 29, the high and low limit signals on leads 27 and 29 provide buffet protection and together with mid-value selector 30 assures that the control system operates between the high and low limits. Thus, the output of mid-value selector 30 on lead 31 is the system Mach target speed and the Mach reference computer 26 and midvalue selector constitute a means for providing on lead 31 a signal representing a reference cruise speed or Mach target speed, $M_{TGT}$, for the aircraft.

The Mach target signal on lead 31 is supplied as one input to the EPR target computers 19, 20 and 21 for each of the aircraft's engines. The other inputs to each of the EPR target computers is each engine's contribution to the total thrust required to be imparted to the aircraft to overcome the aircraft's drag at the reference or target Mach number and altitude. The latter signal is generated by the thrust target computer 35 which is responsive to the Mach target signal on lead 31 and a signal on lead 36 proportional to the weight of the aircraft as computed by a weight computer 37. Since the actual weight term required by the thrust target computer 35 is the actual weight to pressure altitude ratio $W/\delta$, the pressure altitude factor $\delta$ is obtained from conventional air data computer 38 on lead 39 and is supplied to divider 40 so that the weight signal on lead 36 is the required $W/\delta$ signal for thrust target computer 35.

The weight computer 37 may be apparatus responsive to the manifest weight modified by fuel flow in conventional fashion or may be of the type disclosed in the above referenced U.S. Pat. 4,110,605. However, a preferred weight computer may be of the type disclosed in the present inventor's co-pending patent application Ser. No. 333,097, filed Dec. 21, 1981 entitled "Enroute Weight Computer for Aircraft".

Figure 2:
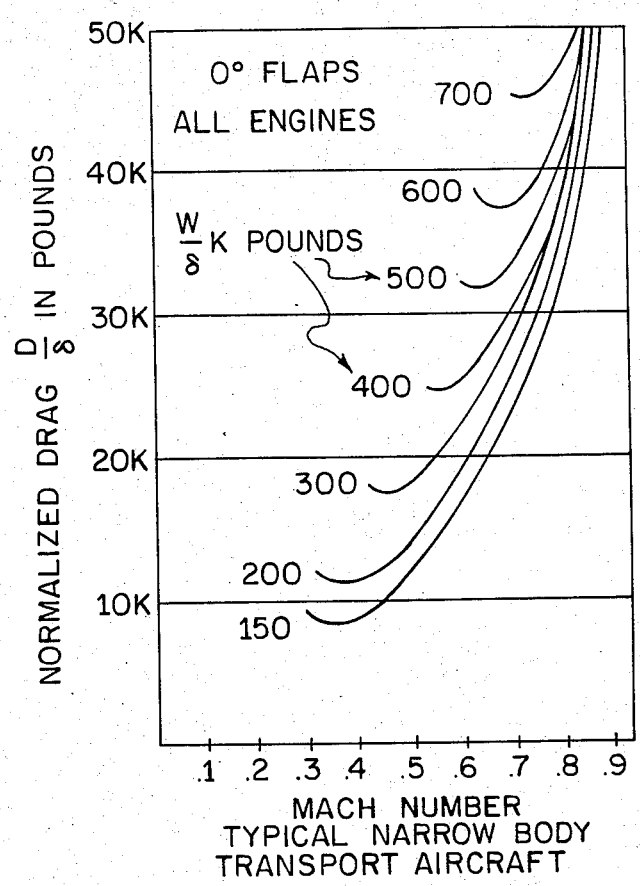
FIG. 2 is a graph illustrating the thrust required to overcome aircraft drag at a desired Mach cruise speed for a typical jet transport aircraft.

The thrust target signal computation may be performed by entirely conventional analog or digital techniques. Within the computer 35 is stored the data illustrated graphically in FIG. 2. For example, if a digital computer is used, this graphical data is suitably coded and stored in a digital PROM. The computer 35 receives the $M_{TGT}$ and $W/\delta$ signals, which signals are used conventionally to address the PROM to determine the aircraft drag term $D/\delta$ corresponding thereto. Since in the cruise mode, the thrust must be equal to the drag, the $D/\delta$ term is required $T/\delta$ for the aircraft to maintain the Mach target for the existing weight and cruise altitude. For example, if the desired Mach target is 0.68 and the existing aircraft $W./\delta$ is 400,000 pounds, the required target $T/\delta$ is 30,000 pounds. Thus, the output of computer 35 on lead 41 is a signal proportional to the thrust target $(T/\delta)_{TGT}$. This signal is divided by the number of engines, in the present illustration 3, by divider 42 and supplied to EPR computers 19, 20 and 21 through lead 43. It should be recognized that the PROM data is nominal data derived from flight test of a new aircraft and engines which data will vary with age. As will be described below, the present invention provides means for compensating for any changes in or departures from this nominal data.

Figure 3:
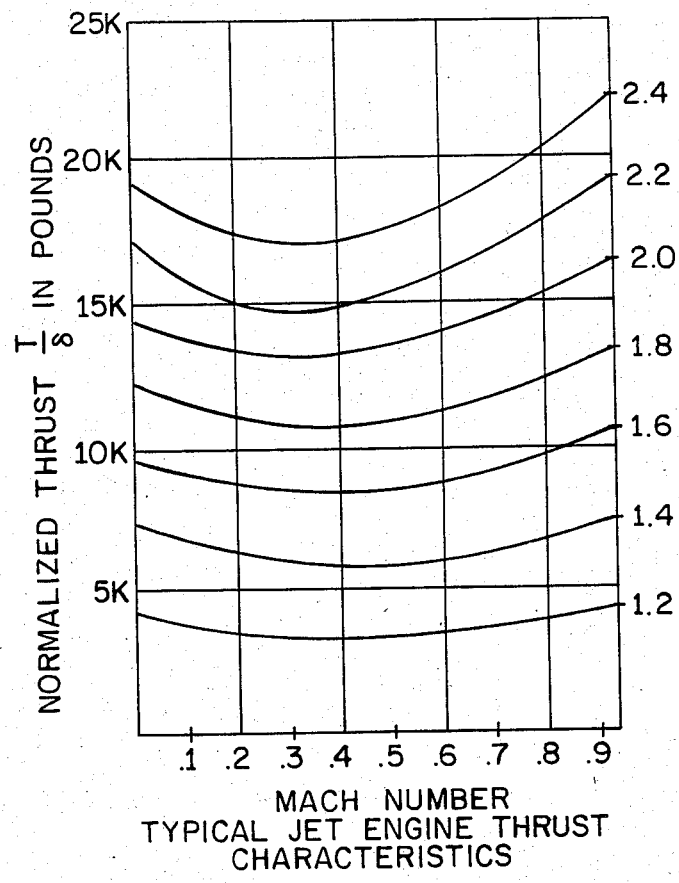
FIG. 3 is a graph illustrating the engine pressure ratio (EPR) required to produce a target thrust at a desired Mach cruise speed for one engine of a typical jet transport aircraft.

Each of the EPR target computers 19', 20 and 21 are the same and operate in the same manner as the thrust target computer 35. Within each EPR target computer is stored the data illustrated graphically in FIG. 3. Again, if a digital computer is used, this graphical data, one set for each aircraft engine, is stored in a digital PROM. Each computer receives the $M_{TGT}$ and $(T/\delta)_{TGT}$ signals, which signals are used conventionally to address the appropriate PROM to determine the corresponding EPR target. For example, if the desired M is 0.68 and the total $(T/\delta)_{TGT}$ is 30,000, and assuming all engines are identical, each engine will have to supply 10,000 pounds and the EPR target for each engine would be 1.68. Thus, the output signal for each EPR TGT computer on leads 19', 20' and 21' are supplied to the summing junctions 13, 14 and 15 as described above.

Assume that the system is activated either manually or automatically when the Mach error is less than, say, 0.0025M. Under these conditions, switches 50 and 51 will be in the positions shown in FIG. 1; that is, switch 50 will be closed and switch 51 will be open. Assume further that the aircraft drag is significantly greater than the nominal value. The computed thrust target on lead 41 will be inadequate to maintain the desired Mach number and the aircraft will begin to decelerate or slow down. The actual Mach number is sensed by Air Data Computer 38 and is filtered by filter 61 to minimize signal noise. The filtered Mach signal on lead 57 is subtracted from the Mach target on lead 31 at summing junction 56 providing a Mach error signal $\Delta M$ on lead 65. The Mach error signal is simultaneously applied to the input of an integrator 52 and an isolation filter 53. Since both the autothrottle servo loop and the autopilot servo loop includes displacement and integral paths, the filter 53 provides frequency isolation between the pitch axis of the autopilot and the autothrottle system. The filter 53 also minimizes the effects of short term gusts and longer term atmospheric pressure waves, while at the same time allowing reasonably timely corrections for speed errors. In one typical application, the isolation filter 53 was designed to provide the following transfer function $$e_{out} = \frac{1}{(\tau S + 1)} \cdot e_{in}$$

The output signal of the integrator on lead 55 is summed with the output signal of the isolation filter on lead 62 at summing junction 63, the output signal of which constitutes a signal corresponding to an incremental thrust required to compensate for the higher than nominal drag. This incremental thrust signal is added to the target thrust signal on lead 41 at summing junction 49 to determine the total thrust required to maintain the desired speed. As the additional thrust causes the aircraft to accelerate toward the desired Mach number, the Mach error will, of course, decrease toward zero. As zero error is achieved, the output of the isolation filter 53 will be zero, but the output signal of the integrator 52 will maintain a value equal to the incremental thrust required to maintain the desired Mach number. This incremental thrust is a direct measurement of the actual aircraft drag minus the nominal drag since in unaccelerated cruise flight the thrust of the aircraft must equal the drag. Thus the steady state output signal of the integrator on lead 55 when the desired Mach has been obtained is divided by divider 77 the Target thrust on lead 41 to compute a Drag Degradation Ratio signal on lead 54 which is used as an input to the Mach Ref. Computer 26 to adjust the Mach Target, thus automatically compensating for any time and/or and changes in the drag characteristics of the aircraft.

In accordance with the present invention, the Mach error signal on lead 65 which is essentially a displacement command signal, is also supplied through a displacement gain 66 to the autopilot 25 pitch channel, which in cruise is normally in an altitude hold mode. In this mode, the altitude hold sensor 45 (which may be part of the autopilot or part of the performance management system and controlled by conventional intersystem switching) provides a signal Δ H, on lead 46 to the autopilot through displacement path 25a and conventional integral path 25b upon departure from the cruise altitude to pitch the aircraft up or down in order to reduce the altitude error signal to zero and return the aircraft to its reference cruise altitude in conventional fashion.

A signal proportional to the rate of change of actual Mach M, on lead 68 is derived through a rate taker 67 responsive to the actual Mach signal on lead 57 and combined at summing junction 69 with the Mach error signal on lead 65 and the resultant therof processed through limiter 70 (to protect against excessive altitude changes) and combined with the altitude deviation or altitude error signal on lead 46 at summing junction 71 and transmitted to the autopilot pitch computer 25.

As discussed at the outset, it is a principal object of the present invention to provide a fuel efficient Mach cruise control system wherein the commanded Mach speed is automatically maintained with minimum throttle activity. The above-described cruise speed control system accomplishes this by providing vernier control of speed through controlling the direction of the aircraft lift vector and providing vernier control of altitude by controlling the total energy of the aircraft by adding or subtracting thrust. It will be noted that the generally short term speed signals Δ M and M are controlled through the control of pitch attitude and that only long term speed signals $M_{TGT}$, T/δ and T/δ are controlled through the control of the throttles, thus providing the desired accuracy and minimization of throttle activity.

Accordingly, the operation of the system may be best understood by first assuming that the aircraft has achieved the desired or selected cruise altitude, the throttles have been set to achieve the cruise Mach for the existing aircraft weight at that altitude and the autopilot has been engaged in the altitude hold mode to automatically hold the selected cruise altitude. Now, assume that a disturbance is encountered which results in a reduction in the actual Mach speed. This speed reduction is sensed by the aircraft computer 38 resulting in a change in the actual Mach signal on lead 57 thereby producing a Mach error signal on lead 65. This error signal hereinabove referred to as an altitude displacement bias signal is applied to the autopilot as if it were an altitude error command and in a sense to decrease altitude; that is, to pitch the craft downward. As a result, the craft tends to increase its speed in order to reduce the Mach error to zero. As the Mach error is reduced, the pitch command decreases and when the Mach error returns to zero, the pitch command returns to zero in order to maintain the commanded Mach speed. The Mach rate term from rate taker 67 provides a damping function for the speed control-on-pitch control loop. Note that the Mach error term provides the pitch command function while the Mach rate term provides the loop damping function and that neither of these relatively short-term functions reach the throttle control $loop_2$ because of isolation filter 53.

The Mach error tends to be reduced toward zero by the exchange of potential and kinetic energies through the action of the speed control-on-pitch loop as described. As a result of the energy exchange, the aircraft will be displaced from the reference altitude by an amount proportional to the Mach error, but limited to a predetermined amount by limit 70. Should the Mach error persist in the long term, the autothrottle loop will alter the total thrust of the aircraft thus reducing the Mach error to zero, and, hence, the altitude displacement to zero. In accordance with the present invention, the isolation filter 53 serves to isolate the autothrottle system from the short term dynamics of the speed control-on-pitch loop.

Now let us assume that the system is engaged at an actual Mach number significantly different from the desired Mach number as sensed by level detector 75 responsive to this Δ M signal. In this case, switch 50 will be in the open position while switch 51 will be in the closed position. By this means, the Mach error is supplied to the non-linear gain 72 and creates an incremental EPR or N1 feed forward command, the magnitude and algebraic sign of which is dependent upon the magnitude and algebraic sign of the Mach error. The output of non-linear gain 72 is divided by the number of aircraft engines, as above, and applied to summing junctions 13, 14 and 15 through lead 74. By this means, the outputs on leads 16, 17 and 18 represent either a substantial increase or decrease in the EPR target for the desired Mach number dependent on whether the aircraft must accelerate or decelerate to achieve the desired Mach number. Throttle servos 1, 2 and 3 adjust the engine pressure ratios to achieve the new target EPR's as explained above. As the aircraft accelerates or decelerates towards the desired Mach number, non-linear gain 72 adjusts the incremental EPR or N1 until, when the Mach error is less than a predetermined amount e.g. <0.0025M, the incremental EPR or N1 is zero and switches 50 and 51 are returned to the positions shown on FIG. 1. At this time, Mach control is achieved by the apparatus described previously.

It is significant to note that in the present invention there are no high frequency or short term signals used as primary commands to the autothrottle so that all throttle controls are smooth and immune to atmospheric disturbances.

While the invention has been described in its preferred embodiments, it is to be understood that the words which have been used are words of description rather than limitation and that changes may be made within the purview of the appended claims without departing from the true scope and spirit of the invention in its broader aspects.

What is claimed:

1. A speed control system for aircraft having an automatic throttle control means for controlling the thrust imparted to the aircraft and having first dynamic response characteristics and an automatic altitude control means for controlling pitch attitude to maintain a predetermined altitude and having second dynamic response characteristics comprising:

means providing a speed error signal proportional to the difference between a reference speed and the actual speed, means providing an altitude error signal proportional to the difference between a reference altitude and the actual altitude, first integrator means responsive to said speed error signal for controlling said throttle control means, second integrator means responsive to said altitude error signal and said speed error signal for controlling said altitude control means, and isolation filter means responsive to said speed error signal for additionally controlling said throttle control means, said filter having a frequency response to said speed error signal such as to minimize interference between said first and second dynamic response characteristics by accepting long term changes in airspeed and rejecting short term changes in airspeed due to changes in pitch attitude.

2. Speed control system as set forth in claim 1 wherein said automatic throttle control means includes thrust target computer means responsive to a signal proportional to said reference speed and to a signal proportional to the weight and existing pressure altitude of the aircraft for providing a thrust target signal proportional to the thrust of the aircraft engine required to achieve said reference speed, and first summing junction means responsive to the output of said first integrator means and said isolation filter means for algebraically summing the outputs thereof and for providing an incremental thrust signal to second summing junction means for adjusting the value of said thrust target signal.

3. A speed control system as set forth in claim 2 further including reference speed computer means for computing the value of said reference speed signal as a function of the actual drag characteristics of said aircraft, and means for supplying the output of said first integrator means to said reference speed computer means for compensating for changes in said actual drag characteristics of the aircraft.

4. A speed control system as set forth in claim 3 wherein said means for supplying said first integrator output signal to said reference speed computer means includes divider means responsive to said output of said first integrator means and to said thrust target signal for providing a signal proportional to the quotient thereof.

5. A speed control system as set forth in claim 2 wherein said automatic throttle control means includes
means for sensing and providing a signal proportional to the actual thrust of the engine,
throttle servo means responsive to said actual thrust signal for controlling the engine throttle to achieve and maintain said sensed engine thrust, and
second computer means responsive to said reference speed signal and the adjusted value of said thrust target signal for commanding the value of said actual thrust signal.

6. A speed control system as set forth in claim 5 wherein said actual thrust sensor means comprises an engine pressure ratio sensor.

7. A speed control system as set forth in claim 6 further including engine pressure engine pressure ratio computer means responsive to said reference speed signal and said adjusted thrust target signal for providing an engine pressure ratio target signal and
means responsive to said actual engine pressure ratio signal and said engine pressure ratio target signal for controlling said engine throttle servo means.

8. A speed control system as set forth in claim 7 further including
non-linear gain control means responsive to said speed error signal for further controlling the said engine throttle servo means, and
logic means responsive to a value of said speed error signal greater than a predetermined value for supplying the output of said non-linear gain control means to said throttle servo means.

9. A speed control system as set forth in claim 8 further including
further logic means also responsive to said speed error signal greater than said predetermined value for inhibiting the supply of the output of said first integral means to said throttle control means.

10. A speed control system as set forth in claim 9 wherein said further logic means additionally inhibits the supply of the output of said isolation filter means to said throttle control means.

11. A cruise speed control system for aircraft comprising:
automatic throttle control means having automatic thrust control means for maintaining the speed of the aircraft at a predetermined reference speed,
automatic pilot means having automatic altitude control means for maintaining the aircraft at a predetermined altitude,
means providing a speed error signal proportional to the difference between the actual airspeed of the aircraft and said reference speed,
means providing an altitude error signal proportional to the difference between the actual altitude of the aircraft and said predetermined altitude,
means for supplying said altitude error signal and said speed error signal to said automatic altitude control means,
means for integrating said speed error signal and for supplying the output thereof to said automatic throttle control means,
low-pass isolation filter means responsive to said speed error signal, and
means for supplying said filtered speed error signal to said automatic throttle control means, the signal transfer function of said filter means being such as to distinguish differences between the dynamic response characteristics of said automatic throttle control means and said automatic pilot means to said speed error signal supplied thereto.

* * * * *